United States Patent [19]
Reiker

[11] Patent Number: 5,942,726
[45] Date of Patent: *Aug. 24, 1999

[54] SELF-ATTACHING ELECTRICAL BOX

[76] Inventor: Kenneth H. Reiker, P.O. Box 4106, Shalimar, Fla. 32579

[ * ] Notice: This patent issued on a continued prosecution application filed under 37 CFR 1.53(d), and is subject to the twenty year patent term provisions of 35 U.S.C. 154(a)(2).

[21] Appl. No.: 08/490,759

[22] Filed: Jun. 15, 1995

Related U.S. Application Data

[63] Continuation-in-part of application No. 08/371,695, Jan. 12, 1995.

[51] Int. Cl.$^6$ ....................................................... H02G 3/12
[52] U.S. Cl. ............................. 174/58; 220/3.3; 220/3.9; 248/906
[58] Field of Search ................................. 174/48, 58, 53, 174/57; 220/3.2, 3.3, 3.9; 248/906

[56] References Cited

U.S. PATENT DOCUMENTS

| | | |
|---|---|---|
| Re. 33,147 | 1/1990 | Reiker . |
| D. 288,289 | 2/1987 | Reiker . |
| 1,133,535 | 3/1915 | Cain et al. . |
| 1,819,460 | 8/1931 | Frank . |
| 2,264,666 | 12/1941 | Hexdall . |
| 2,423,757 | 7/1947 | Dedge . |
| 2,528,418 | 10/1950 | Buckels . |
| 2,809,002 | 10/1957 | Rudolph . |
| 2,917,263 | 12/1959 | Appleton et al. . |
| 2,945,661 | 7/1960 | Appleton . |
| 2,973,175 | 2/1961 | Appleton . |
| 3,097,821 | 7/1963 | Richards . |
| 3,104,087 | 9/1963 | Budnick et al. . |
| 3,214,126 | 10/1965 | Roos . |
| 3,425,655 | 2/1969 | Cogdill . |
| 3,518,421 | 6/1970 | Cogdill . |
| 4,050,603 | 9/1977 | Harris et al. . |
| 4,062,512 | 12/1977 | Arnold . |
| 4,140,293 | 2/1979 | Hansen . |
| 4,165,851 | 8/1979 | Bowden, Jr. et al. . |
| 4,263,472 | 4/1981 | Maheu ................................... 174/57 X |
| 4,273,957 | 6/1981 | Kolling, Jr. ........................... 174/53 X |
| 4,463,923 | 8/1984 | Reiker . |
| 4,684,092 | 8/1987 | Reiker . |
| 4,787,587 | 11/1988 | Deming . |
| 4,880,128 | 11/1989 | Jorgensen . |
| 4,909,405 | 3/1990 | Kerr, Jr. . |
| 5,024,412 | 6/1991 | Hung et al. . |
| 5,044,582 | 9/1991 | Walters . |
| 5,065,968 | 11/1991 | Kesler et al. ......................... 174/58 X |
| 5,074,515 | 12/1991 | Carter, Jr. . |
| 5,150,868 | 9/1992 | Kaden . |
| 5,234,119 | 8/1993 | Jorgensen et al. . |
| 5,303,894 | 4/1994 | Deschamps et al. . |
| 5,349,134 | 9/1994 | Russell .................................... 174/48 |
| 5,408,045 | 4/1995 | Jorgensen et al. . |
| 5,484,076 | 1/1996 | Petrushka . |
| 5,522,577 | 6/1996 | Roesch ................................ 248/906 X |

Primary Examiner—Dean A. Reichard
Attorney, Agent, or Firm—Shlesinger, Arkwright & Garvey LLP

[57] ABSTRACT

A junction box includes a wall defining a junction box cavity therein. There is a fastening element provided on the junction box for temporarily attaching the junction box to a support. There may likewise be provided a fastener for permanently attaching the junction box to the support. A method of attaching a junction box to a support includes first temporarily attaching the junction box to a support, and then permanently attaching the junction box to the support.

44 Claims, 3 Drawing Sheets

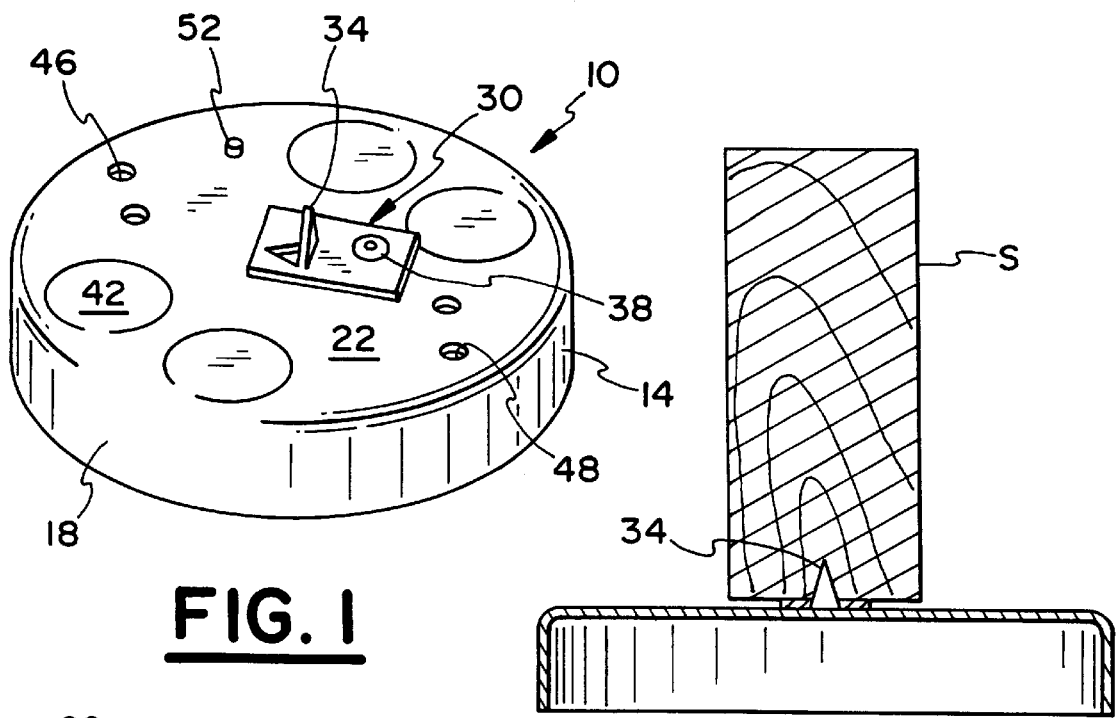
FIG. 1
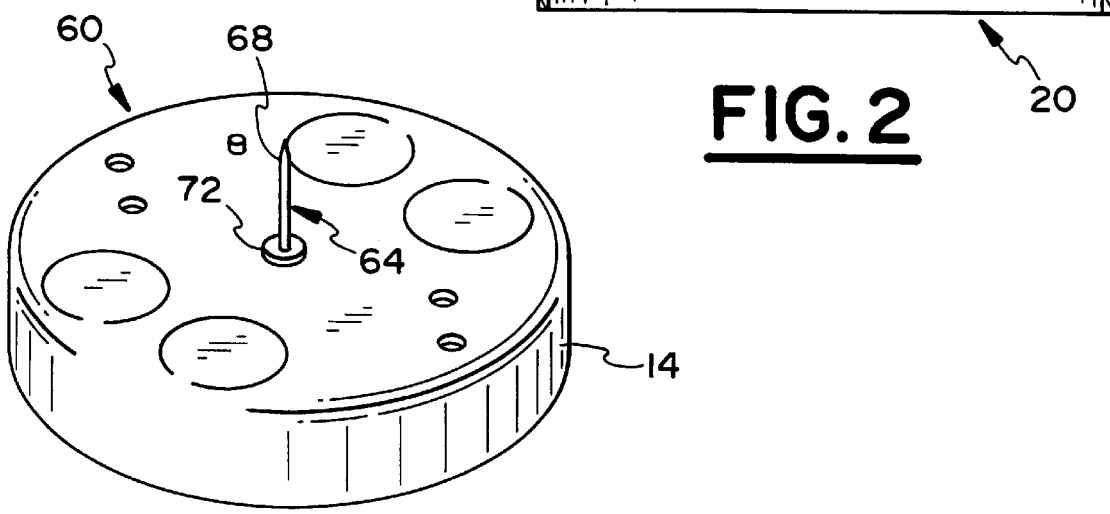
FIG. 2
FIG. 3
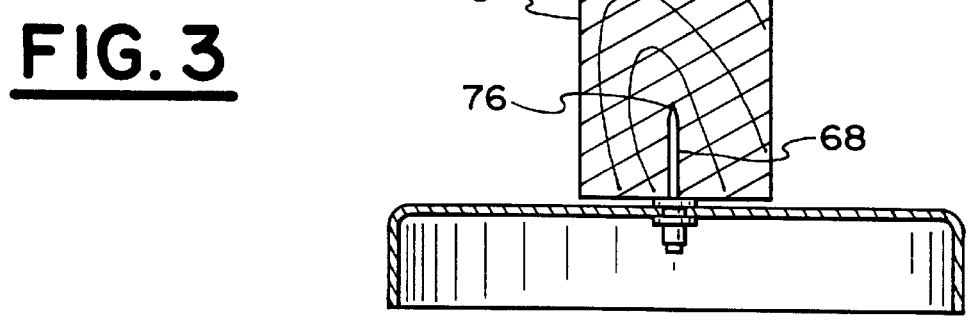
FIG. 4

SELF-ATTACHING ELECTRICAL BOX

CROSS-REFERENCE TO RELATED APPLICATIONS

This application is a continuation-in-part of application Ser. No. 08/371,695, filed Jan. 12, 1995, and which is incorporated herein by reference. This application is also related to application Ser. No. 08/490,757, entitled "Self-Adhering Electrical Box," which was also filed on Jun. 15, 1995 now U.S. Pat. No. 5,677,512.

FIELD OF THE INVENTION

This invention relates to a mounting assembly; and, in particular, to a self-attaching electrical box for insulation on walls, floors, and ceilings.

BACKGROUND OF THE INVENTION

Conventional electrical boxes exist that can be readily attached to an object, such as a stud in a wall by the use of fasteners.

Typically, conventional electrical boxes or junction boxes are provided with holes through which a fastener is inserted for securing the junction box to a supporting surface.

There even exist junction boxes made of synthetic plastic materials which have two nails or screws attached to the wall of the junction box.

In use, such conventional junction boxes with a pre-attached nail on a side wall thereof, require a user to locate and align the junction box in its correct intended position, and maintain the correct position of the junction box while attempting to hammer the nail or to screw the screw into the support surface.

Thus, such conventional junction boxes, even when provided with pre-attached fasteners, are difficult to install correctly. Experienced tradespeople who can install such conventional junction boxes in the desired location on their first attempt at installation may succeed when the installation is on an easily accessible vertical surface located at a height convenient to the user's hands, and typically at a comfortable height relative to the user's hands and eyes.

Even skilled craftspeople have difficulty installing junction boxes at awkward locations, in overhead installation, and the like.

Still further, junction boxes and electrical fixture mounting boxes are often used to carry relatively large static and dynamic loads, such as chandeliers and ceiling fans, and proper installation of the junction box is necessary.

Examples of known devices include U.S. Pat. No. 5,234,119 to Jorgensen et al.; U.S. Pat. No. 4,880,128 to Jorgensen; U.S. Pat. No. 4,140,293 to Hansen; U.S. Pat. No. 3,097,821 to Richards; U.S. Pat. No. 2,973,175 to Appleton; U.S. Pat. No. 2,423,757 to Dedge; U.S. Pat. No. 2,264,666 to Hexdall; and U.S. Pat. No. 1,819,460 to Frank. Although each of these devices undoubtedly works well, there is a need for a junction box which can be even more readily manufactured and installed.

Thus, it will be appreciated that there is a need for an electric mounting box which can be used for a variety of applications, and which is easy to manufacture, to install, and to use.

OBJECTS AND SUMMARY OF THE INVENTION

Accordingly, it is an object of the invention to provide a junction box which overcomes the drawbacks and disadvantages of the prior art devices.

A further object of the invention is to provide a junction box suited for use on and in walls, floors, and ceilings, regardless of the location or configuration of the surface to which the junction box is attached.

Another object of the invention is to provide a junction box which can be inexpensively manufactured.

A still further object of the invention is to provide a junction box engineered so that large static and dynamic loads are transferred directly to the mounting surface on which the junction box is installed, as opposed to transferring forces to the junction box itself.

A further object of the invention is to provide a junction box suitable for use in new construction as well as for use in retrofitting.

Another object of the invention is to provide a junction box which is easier and faster to install and to use than conventional devices.

Yet a further object of the invention is to provide a junction box which can be temporarily attached, as well as permanently attached, to a variety of support surfaces.

A still further object of the invention is to provide a junction box suited for "single-handed" installation.

Another object of the invention is to provide a junction box which can be readily installed by one person.

Another object of the invention is to provide a junction box which is quicker to install than conventional devices.

It is a yet a still further object of the invention to provide a junction box which is easier for professionals as well as for lay people to install.

A further object of the invention is to provide a junction box which is easier to precisely locate and install than conventional devices.

Another object of the invention is to provide a junction box which has the means for temporarily attaching the junction box to a support surface, which means is provided as part of a junction box assembly.

A further object of the invention is to provide a junction box which can be installed by physically challenged individuals.

Another further object of the invention is to provide a junction box having means for temporarily securing the junction box to a surface, as well as means for permanently attaching the junction box to the surface, both provided in a single assembly.

It is a still further object of the invention to provide a junction box which is fire-resistant and/or fire-proof.

In summary, therefore, the invention is directed to a junction box including a wall defining a junction box cavity therein, and means disposed on the wall for attaching the junction box to a support.

The invention will be further described with reference to the following drawings.

BRIEF DESCRIPTION OF THE DRAWINGS

FIG. 1 is a perspective view of a preferred embodiment of a junction box according to my invention;

FIG. 2 is a sectional view of the junction box of FIG. 1, shown mounted on a support;

FIG. 3 is a further preferred embodiment of a junction box according to my invention;

FIG. 4 is a sectional view of the junction of FIG. 3, shown in use;

Figure 5:
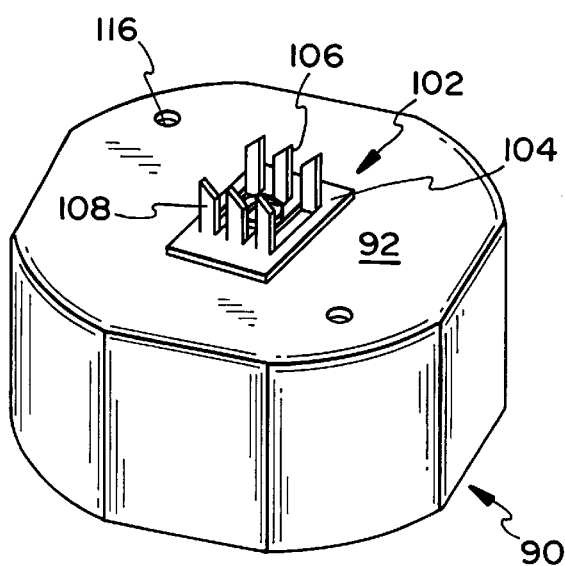
FIG. 5 is a perspective view of another preferred embodiment of a junction box according to my invention.

It will be understood that terms such as "junction box", "electrical box", "receptacle", and the like are intended to be synonymous and all sorts of boxes mountable on a support surface are intended to be within the scope of the invention. Relative terms, such as "up" and "down", are for convenience and are not intended to be limiting.

DETAILED DESCRIPTION OF THE INVENTION

FIGS. 1 and 2 illustrate a first preferred embodiment of a junction box 10 according to the invention.

Junction box 10 includes a junction box housing 14 having a side wall 18. A junction box cavity 20 is jointly defined by side wall 18 and an upper wall 22.

There is a means provided on junction box 10 for temporarily attaching junction box 10 to a support S. Such temporary attaching means may include an attaching element 30 having an extension 34 provided thereon. Extension or protrusion 34 will extend outwardly from junction box housing 14 a sufficient distance to secure junction box 10 to support S. Attaching element 30 may be attached to upper wall 22, for example, by use of a fastener 38, such as a rivet.

It is contemplated that protrusion 34 will be manufactured integrally with junction box housing 14, such as when one or more removable plates or knockouts 42 are formed, as in the case where junction box housing 14 is stamped out of sheetmetal.

Likewise, one or more holes 46 and 48 will extend through upper wall 22 and be configured for receiving a fastener therethrough. Holes 46 and 48 may be referred to as permanent fastener holes, given that the fasteners for permanently attaching junction box 10 to a support S will typically be inserted therethrough, as described in detail below.

Extension 34 may be configured for engaging a specific material, such as wood or sheetmetal or extension 34 may be configured for engaging a variety of materials.

FIGS. 3 and 4 illustrate another preferred embodiment of a junction box 60 according to the invention.

Junction box 60 includes upper wall 22 to which a temporary fastening means 64 is attached. Temporary fastening means may include a rod-like extension 68 and a connection 72 securing extension 68 to junction box housing 14.

Good results have been achieved when a sharpened point 76 is provided on the end of extension 68.

Extension 68 will have a size, length, configuration, and exterior roughness depending on the expected material from which support S is made and/or the material from which attachment means 64 is made.

Figure 6:
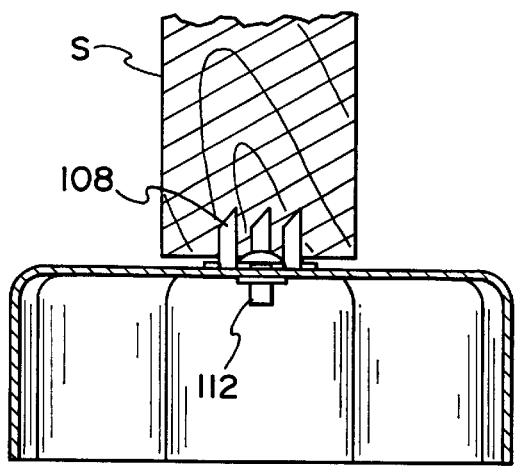
FIG. 6 is a sectional view of the junction box of FIG. 5, shown mounted on a support.

The further preferred embodiment of an electrical device mounting assembly according to the invention shown in FIGS. 5 and 6 includes a junction box 90 having an upper wall 92 to which a temporary attaching element 102 is attached.

Temporary attaching element 102 includes a base 104 and one or more extensions 106 and 108. Temporary attaching element 102 may be secured to upper wall 92 of junction box 90 by a fastener 112.

It is likewise contemplated that one or more of extensions 106 and 108 will be formed directly from material of upper wall 92 during the forming of junction box 90. In other words, in the case of a sheetmetal junction box, it is contemplated that extensions 106 and 108 will be cut and/or stamped out of the sheet metal material from which junction box 90 may readily be fabricated.

One or more holes 116 through which a permanent fastener will be inserted and attached to support S, during use, will be provided in the walls of junction box 90.

As will be readily appreciated, additional holes, knockouts, and grounding elements, such as ground screws may be provided as in the other embodiments described above and below.

It is contemplated that temporary attaching element 102 will have its extensions 106, 108, and the like configured for engaging one or more types of material.

It is expected that the free ends, the sides, as well as the length of extensions 106 and 108 will be selected depending on the material used for the extensions and the material of the support to which junction box 90 is to be attached.

The provision of a plurality of extensions 106 and 108 helps to ensure that at least one of extensions 106 and 108 engages and attaches itself to support S, in use, so as to temporarily attach junction box 90 to support S.

Figure 7:
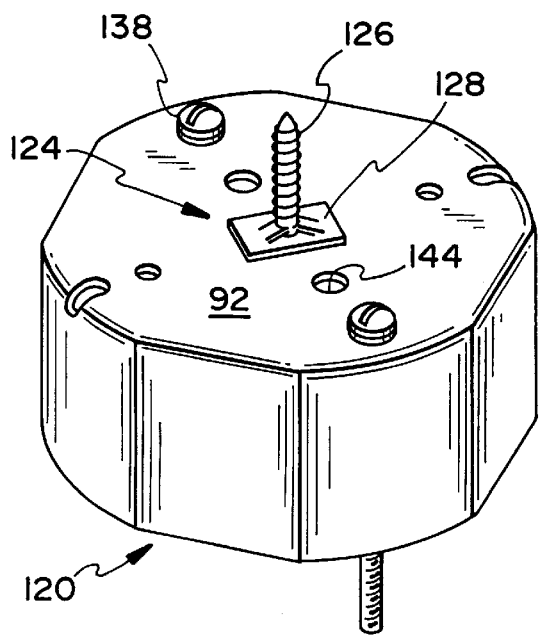
FIG. 7 is a still further preferred embodiment of a junction box according to my invention.
Figure 8:
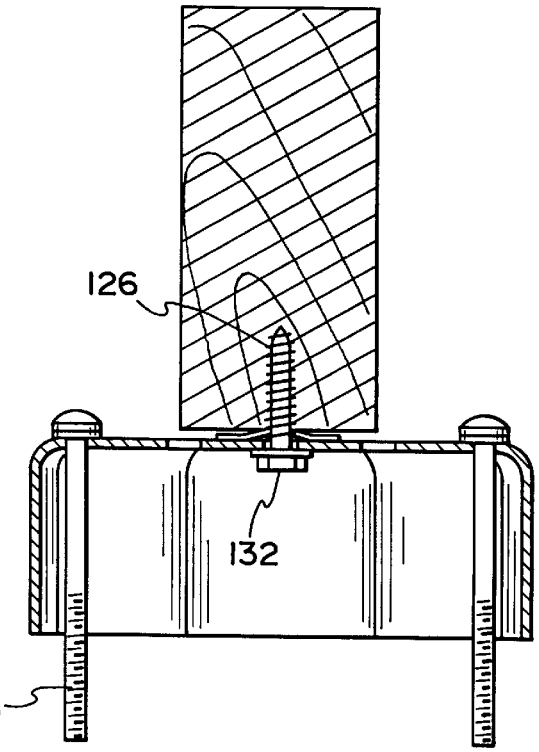
FIG. 8 is sectional view of the junction box of FIG. 7, shown in use.
Figure 9:
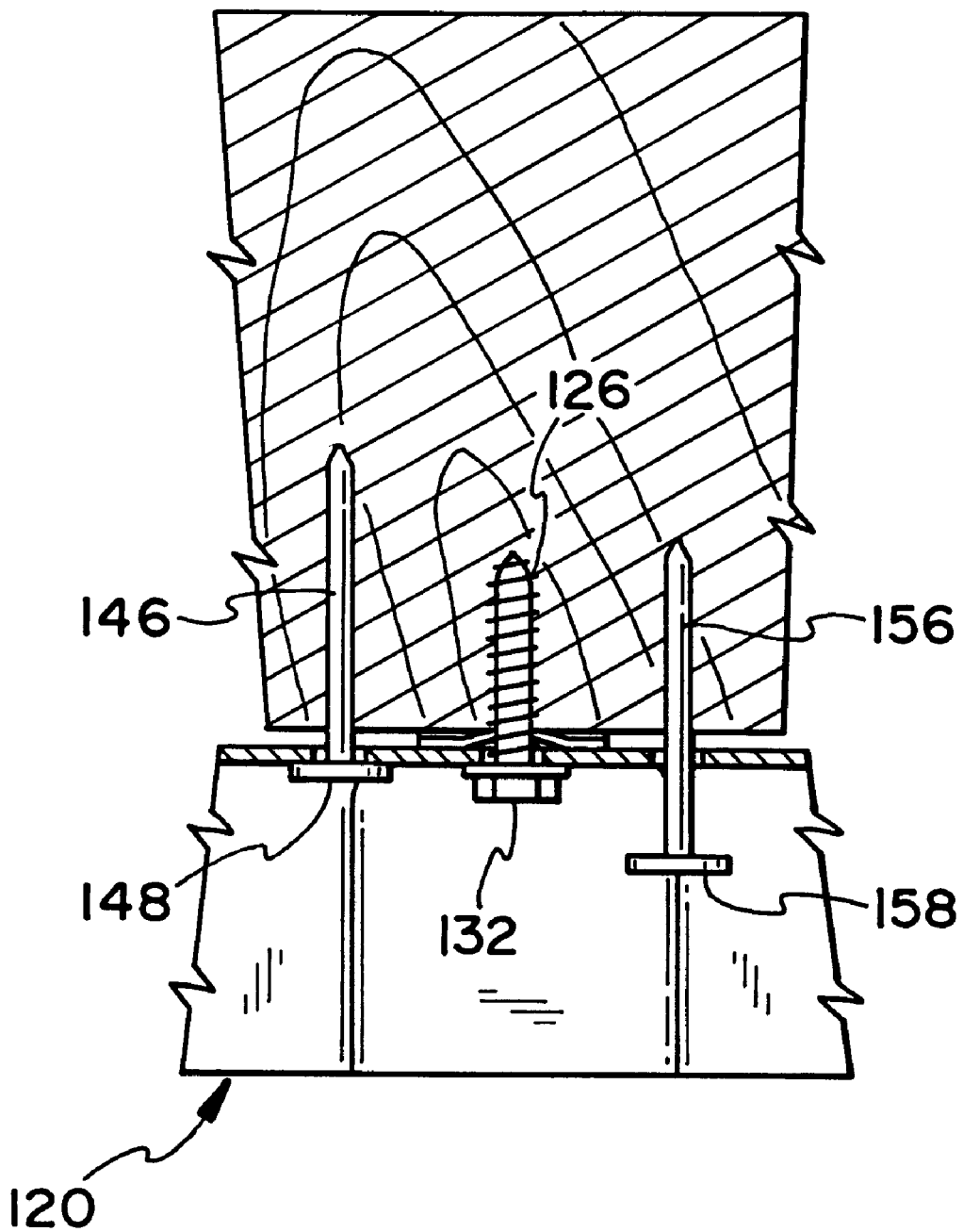
FIG. 9 is a sectional view of the junction box of FIG. 8, shown in use.

Turning now to FIGS. 7–9, a further preferred embodiment of a junction box 120 according to the invention will now be described.

Junction box 120 includes a fastener or attaching element 124 disposed on upper wall 92 for attaching junction box 120 to support S. Depending on the size and configuration of attaching element 124, attaching element 124 will serve to temporarily and/or permanently attach junction box 120 to support S. Attachment means 124 may include a screw 126 and a retaining clip 128. Screw 126 may be provided with a head 132.

Good results have been achieved when retaining clip 128 fixes screw 126 relative to upper wall 92.

It is contemplated that retaining clip 128 will secure screw 126 to junction box 120 sufficiently to maintain the desired orientation between screw 126 and upper wall 92, yet allow rotation of screw 126 relative to wall 92, for example. Whether or not screw 126 can be rotated relative to upper wall 92, one-handed installation is possible. It is contemplated that screw 126 have self-tapping threads for engaging with upper wall 92 when inserted therethrough.

One or more fasteners 138 suitable for securing a fixture, such as a chandelier, ceiling fan, or face plate, for example, may be provided.

Likewise, one or more holes 144 through which one or more permanent fasteners 146 and 156 will be inserted will be provided. Fasteners 146 and 156 have respective heads 148 and 158.

OPERATION

In use, junction box 10 of the preferred embodiment of FIGS. 1 and 2 is installed as follows.

The user holds junction box housing 14 and directs protrusion 34 of attaching element 30 toward the support S to which junction box 10 is to be attached. The user then presses extension 34 into the face of support S. Given the configuration of protrusion 34, a moderate amount of force will be required to extend protrusion 34 sufficiently into the material of support S so that protrusion 34 temporarily attaches junction box 10 to support S.

While protrusion 34 is supporting junction box 10, the user has both his or her hands free in order to pick up a permanent fastener, place the permanent fastener in one of the holes 46 and 48, orient the permanent fastener, and install the permanent fastener such as by screwing or nailing the permanent fastener into support S.

Junction box 60 of the embodiment of FIGS. 3 and 4, as well as junction box 90 of the embodiment of FIGS. 5 and 6, is installed in a similar fashion to the installation of junction box 10 of FIGS. 1 and 2.

It will be appreciated that each of the junction box embodiments of FIGS. 1–6 can be readily temporarily attached to support S by the user applying a force against the junction box housing which force will be concentrated at the respective protrusion and extension for securely engaging support S.

Thus, it will be appreciated, that lay people, as well as physically challenged people will readily be able to installed the junction box according to the invention.

The junction box 120 of the embodiment of FIGS. 7–9 can be installed similarly to the installation of the junction boxes of FIGS. 1–6. That is, the user simply takes junction box 120, orients attaching element 124 for engaging support S, and presses screw 126 into the material of support S.

Alternatively, in the case where retaining clip 128 prevents relative rotational movement between screw 126 and upper wall 92, the user can install attachment means 124 with the use of some upward force (as viewed in the drawings) as well as a rotational force being applied about the longitudinal axis of screw 126, such as by grasping the exterior of the junction box housing and rotating the junction box housing.

Typically the junction box housing will be substantially larger than the diameter of the threaded shaft of screw 126; therefore, the user can easily apply a rotational force sufficient to screw screw 126 into the material of support S. The relatively large size of the junction box housing as compared to the diameter of the screw shaft of screw 126 provides the user with a relatively large lever arm for gaining a mechanical advantage, in other words, when upper wall 92 and, hence, the junction box housing are rotationally fixed, the user can apply more rotational effort to screw 126, than if the user had been attempting to screw in screw 126 by the use of a screwdriver engaging screw head 132.

Depending on the material of support S, the user can completely press in or screw in screw 126 by pressing on or rotating junction box 120. Alternatively, after screw 126 has been partially installed, the user can release junction box 120, leaving junction box 120 secured to support S. Thus, both of the user's hands are free in order to complete the insertion of screw 126 by use of a screwdriver or a power screwdriver.

FIG. 9 shows the installation of permanent fasteners 146 and 156.

Fasteners 146 and 156 are schematically illustrated as nails having heads 148 and 158, respectively. Nail 156 has been partially installed, and nail 146 has been completely installed.

Permanent fasteners can be installed in the above-described embodiments of FIGS. 1–6 in a manner similar to the installation of permanent fasteners 146 and 156 in the embodiment of FIGS. 7–9.

Expected mounting surfaces include walls, ceilings, floors, studs, joists, plywoods, sheet metal studs, synthetic and composite materials, and the like. It is thus contemplated that any temporary and permanent fastener suitable for engaging such materials may be used in accordance with my invention.

The junction box according to my invention will likewise be made of various plastics, composite materials, stamped sheetmetal, and the like depending on the intended used and/or depending on whether the junction box assembly is to be fire-resistant.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. An electrical device mounting assembly, including:
   a) a box;
   b) said box including a wall defining a cavity therein;
   c) means attached to said wall prior to use for temporarily attaching said box to a support surface; and
   d) means provided on said box for permanently attaching said box to the support surface; and
   e) at least one of said means for temporarily attaching said box and said means for permanently attaching said box being disposed immediately adjacent said box.

2. A device as defined in claim 1, wherein:
   a) said means for temporarily attaching said box includes an extension protruding outwardly of said box.

3. A device as defined in claim 1, wherein:
   a) said means for temporarily attaching said box includes a nail.

4. A device as defined in claim 1, wherein:
   a) said means for temporarily attaching said box includes a screw.

5. A device as defined in claim 1, wherein:
   a) said means for permanently attaching said box includes a nail.

6. A device as defined in claim 1, wherein:
   a) said means for permanently attaching said box includes a screw.

7. An electrical device, comprising:
   a) an electrical box;
   b) said electrical box including at least one wall defining a cavity therein;
   c) an attachment element integrally attached to at least one of said at least one wall; and
   d) said attachment element being sufficiently strong to attach said electrical box to a support.

8. An electrical device as defined in claim 7, wherein:
   a) said attachment element includes a protrusion extending outwardly of said electrical box.

9. An electrical device as defined in claim 7, wherein:
   a) said attachment element includes a screw.

10. An electrical device as defined in claim 7, wherein:
    a) said attachment element includes a nail.

11. An electrical fixture mounting assembly, comprising:
    a) a junction box;

b) said junction box including a wall defining a junction box cavity therein;

c) means disposed immediately adjacent to and attached to said wall prior to use for temporarily attaching said junction box to a support; and d) said temporary attaching means being configured for extending into a material of the support when said temporary attaching means attaches said junction box to the support.

12. An electrical fixture mounting assembly as in claim 11, wherein:

a) said temporary attaching means includes a protrusion extending outwardly of said junction box.

13. An electrical fixture mounting assembly as in claim 12, wherein:

a) said protrusion includes a nail.

14. An electrical fixture mounting assembly as in claim 11, wherein:

a) said temporary attaching means includes a protrusion configured for engaging a wooden material.

15. An electrical fixture mounting assembly as in claim 11, wherein:

a) said temporary attaching means includes a protrusion configured for engaging a metal material.

16. An electrical device, comprising:

a) an electrical box;

b) said electrical box including at least one wall defining a cavity therein;

c) an attachment element disposed immediately adjacent to and attached to at least one of said at least one wall prior to use;

d) said attachment element being configured for extending into a material of a support when said attachment element attaches said electrical box to the support; and e) said attachment element being sufficiently strong to attach said electrical box to the support.

17. A device as defined in claim 16, wherein:

a) said attachment element includes a protrusion outwardly of said electrical box.

18. A device as defined in claim 16, wherein:

a) said attachment element includes a screw.

19. A device as defined in claim 16, wherein:

a) said attachment element includes a nail.

20. An electrical device, comprising:

a) an electrical box;

b) said electrical box including at least one wall a cavity therein;

c) a pre-attached attachment element substantially integrally attached to at least one of said at least one wall;

d) said pre-attached attachment element being configured for extending into a material of a support when said attachment element attaches said electrical box to the support without the use of tools; and e) said pre-attached attachment element being sufficiently strong to attach said electrical box to the support.

21. A device as defined in claim 20, wherein:

a) said attachment element includes a protrusion extending outwardly of said electrical box.

22. A device as defined in claim 20, wherein:

a) said attachment element includes a screw.

23. A device as defined in claim 20, wherein:

a) said attachment element includes a nail.

24. An electrical device, comprising:

a) an electrical box;

b) said electrical box including a wall defining a cavity therein;

c) said electrical box including a lower portion configured for engaging an electrical fixture;

d) a pre-attached attachment element attached to said wall of said electrical box prior to use;

e) said attachment element being configured for extending into a material of a transversely extending face of a support when said attachment element attaches said electrical box to the support by applying an upward force to the electrical box as said lower portion of said electrical box faces downwardly; and f) said attachment element being sufficiently strong to attach said box to the support.

25. A device as defined in claim 24, wherein:

a) said attachment element includes a protrusion extending outwardly of said electrical box.

26. A device as defined in claim 24, wherein:

a) said attachment element includes a screw.

27. A device as defined in claim 24, wherein:

a) said attachment element includes a nail.

28. A device as defined in claim 1, wherein:

a) said at least one of said means for temporarily attaching said box and said means for permanently attaching said box are disposed on said box.

29. A device as defined in claim 1, wherein:

a) both said means for temporarily attaching said box and said means for permanently attaching said box are disposed immediately adjacent said box.

30. A device as defined in claim 27, wherein:

a) said means for temporarily attaching said box and said means for permanently attaching said box are disposed directly on said box.

31. An electrical fixture mounting assembly as defined in claim 11, wherein:

a) said means for temporarily attaching said junction box is disposed on said wall of said junction box.

32. A device as defined in claim 16, wherein:

a) said attachment element is disposed on said at least one wall.

33. A device as defined in claim 24, wherein:

a) said attachment element is configured for extending into the material of the substantially horizontally extending face of the support when applying an upward force to the electrical box.

34. A device as defined in claim 20, wherein:

a) said pre-attached attachment element includes a screw.

35. A device as defined in claim 20, wherein:

a) said pre-attached attachment element includes a nail.

36. A device as defined in claim 16, wherein:

a) said attachment element includes a screw.

37. A device as defined in claim 16, wherein:

a) said attachment element includes a nail.

38. A device, comprising:

a) a junction box;

b) said junction box including a wall defining a cavity therein;

c) a screw attached to said wall of said junction box; and d) said screw having threads extending outwardly of said junction box, said threads being sized so that said threads can secure said junction box to a support.

39. A device as defined in claim 38, wherein:
a) said screw includes metal.

40. A device as defined in claim 39, wherein:
a) said junction box includes metal.

41. A device as defined in claim 38, wherein:
a) a hole is provided in said wall; and
b) said hole is sized for inserting a fastener therethrough.

42. A device as defined in claim 38, wherein:
a) a hole is provided in said wall; and
b) said hole is sized for receiving one of a nail and a screw therethrough.

43. A device as defined, in claim 38, wherein:
a) said threads are sized so that said threads can temporarily secure said junction box to the support.

44. A device as defined in claim 24, wherein:
a) said lower portion is configured for engaging at least one of a ceiling fan, chandelier, and face plate.

* * * * *